(12) United States Patent
Wolff et al.

(10) Patent No.: US 6,790,245 B2
(45) Date of Patent: Sep. 14, 2004

(54) CONTROL OF DUST

(75) Inventors: Andrew R. Wolff, Darien, IL (US);
Joseph P. Pircon, Aurora, IL (US);
Mark E. Freetly, Springfield, IL (US)

(73) Assignee: Benetech, Inc., Montgomery, IL (US)

( * ) Notice: Subject to any disclaimer, the term of this patent is extended or adjusted under 35 U.S.C. 154(b) by 0 days.

(21) Appl. No.: 10/265,973

(22) Filed: Oct. 7, 2002

(65) Prior Publication Data

US 2004/0065198 A1 Apr. 8, 2004

(51) Int. Cl.$^7$ .................................................. C09K 3/22
(52) U.S. Cl. ....................................... 44/602; 252/88.1
(58) Field of Search ......................... 44/602; 252/88.1; 95/154

(56) References Cited

U.S. PATENT DOCUMENTS

| | | | | |
|---|---|---|---|---|
| 1,910,975 A | * | 5/1933 | Wallace | 44/602 |
| 2,250,287 A | * | 7/1941 | Work et al. | 44/602 |
| 2,436,146 A | * | 2/1948 | Kleinicke | 252/88.1 |
| 3,711,318 A | | 1/1973 | Trechock et al. | |
| 4,055,471 A | * | 10/1977 | Beck et al. | 201/20 |
| 4,169,170 A | | 9/1979 | Doeksen | |
| 4,369,121 A | | 1/1983 | Callahan et al. | |
| 4,427,719 A | | 1/1984 | Moore | |
| 4,428,984 A | | 1/1984 | Shimizu et al. | |
| 4,501,593 A | | 2/1985 | Paersch et al. | |
| 4,582,511 A | * | 4/1986 | Siddoway et al. | 44/577 |
| 4,642,196 A | | 2/1987 | Yan | |
| 4,737,305 A | | 4/1988 | Dohner | |
| 4,801,635 A | | 1/1989 | Zinkan et al. | |
| 4,836,945 A | | 6/1989 | Kestner | |
| 4,877,418 A | * | 10/1989 | Goleczka et al. | 44/600 |
| 4,971,720 A | | 11/1990 | Roe | |
| 5,176,832 A | | 1/1993 | Dorta et al. | |
| 5,194,174 A | | 3/1993 | Roe et al. | |
| 5,223,165 A | * | 6/1993 | Winstanley et al. | 299/12 |
| 5,271,859 A | | 12/1993 | Roe | |
| 5,302,308 A | | 4/1994 | Roe | |
| 5,310,494 A | | 5/1994 | Bennett | |
| 5,328,497 A | | 7/1994 | Hazlett | |
| 5,383,952 A | | 1/1995 | Singewald et al. | |
| 5,409,626 A | | 4/1995 | Muth | |
| 5,415,795 A | * | 5/1995 | Roe et al. | 427/212 |
| 5,443,650 A | | 8/1995 | Saska et al. | |
| 5,466,294 A | | 11/1995 | Kearney et al. | |
| 5,527,482 A | | 6/1996 | Pullen et al. | |
| 5,536,429 A | * | 7/1996 | Bennett et al. | 44/620 |
| 5,595,782 A | * | 1/1997 | Cole | 427/212 |
| 5,849,364 A | | 12/1998 | Nachtman et al. | |
| 5,863,456 A | | 1/1999 | Pullen | |
| 5,876,622 A | | 3/1999 | Pullen et al. | |
| 5,968,222 A | | 10/1999 | Kodali | |
| 6,086,647 A | * | 7/2000 | Rahm et al. | 44/620 |
| 6,124,366 A | | 9/2000 | Pullen et al. | |

OTHER PUBLICATIONS

Anonymous, *Molasses*; PROSI Magazine–Jun. 1999, No. 365, Sugar Industry. http://www.prosi.net/mag99/365june/molas365.htm.

Anonymous, Dust Buster, http://www.svgintermol.com/products/product_pages/pr_dust_buster.htm.

Anonymous, Pennsylvania Dairy Herd Improvement Association, http://www.dhia.psu.edu/DtoDapril4.htm.

Anonymous, EG&G Berthold, Sugar Production: Massflow and Concentration measurements, and level switching, http://www.berthold.com.au/industrial_pages/sugar%20production.html, Jul. 8, 2002.

Rosen, Milton J., *Surfactant and Interfacial Phenomena*, 2d Edition, Wiley Interscience Publications, 1989.

Anonymous, Monitor Sugar Company, http://www.monitor-sugar.com, Jul. 8, 2002.

Perez, Rena, "Molasses," Tropical Feeds and Feeding Systems, p. 233–239.

Anonymous, "The Origins of Molasses," http://www-.melasse.de/English/herkunft.html, Jul. 8, 2002.

Curtin, Dr. Leo V., "Molasses—General Considerations," *Molasses in Animal Nutrition*, National Feed Ingredients Association, West Des Moines, IA: 1983.

Anonymous, OECD Environmental Health and Safety Publications, Series on the Safety of Novel Foods and Feeds, No. 3. *Consensus Document on Compositional Condsiderations for New Varieties of Sugar Beet: Key Food and Feed Nutrients and Anti–Nutrients*, Paris: 2002.

* cited by examiner

*Primary Examiner*—Duane S. Smith
(74) *Attorney, Agent, or Firm*—Thompson Coburn LLP

(57) ABSTRACT

A method for suppressing dust emanation from a dust-bearing material comprises applying to the material a dust suppressant that comprises molasses-derived protein.

42 Claims, No Drawings

CONTROL OF DUST

BACKGROUND OF THE INVENTION

1. Field of the Invention

The present invention relates to short term residual dust suppression, and more particularly to such suppression by application of a dust suppressant composition to a dust-bearing material.

2. Description of the Prior Art

Dust formation from a variety of sources has been a continuing cause of environmental and health concerns. Particular attention has been paid to the dust developed from the handling of coal, but such sources also include, for example, petroleum coke, recycled glass dust, bauxite, and mined minerals such as iron ore, aluminum ore, copper ore, and limestone. Thus, while this specification may refer at times to coal, it should be understood that this discussion is applicable to numerous other dust sources as well.

Various industries affected by such dust formation have engaged in many efforts to avoid or to alleviate the problem of dust formation that results during handling, conveyance, transportation and even storage of coal and the other dust sources. Typically, such efforts involve the use of water incorporated into a chemical dust suppressant that is applied to the coal or other dust source. Although the categories of dust suppressants have overlapped to some extent in that certain types of suppressants may be reformulated to be applied through a system designed for another type, conventionally a suppressant may fall into the category of a short term dust suppressant, which may be a wet suppressant or a foam suppressant, or a long term residual dust control suppressant. Short term dust suppressants function by coating the source and dust with water. Thus, such suppressants lose their effectiveness upon evaporation of the water. Moreover, their effectiveness generally does not persist beyond one to two impact points; that is, points at which dust is generated during handling or movement of the coal or other source. Examples of wet and foam suppressants are discussed in U.S. Pat. No. 4,737,305 to Dohner, U.S. Pat. No. 4,836,945 to Kestner, U.S. Pat. No. 4,971,720 to Roe, and U.S. Pat. No. 5,409,626 to Muth, and in Surfactants and Interfacial Phenomena, 2d Edition, by Milton J. Rosen, Wiley Interscience Publications (1989), all of which are incorporated herein by reference. Conventionally, long term residual dust suppressants control dust by means of the formation of a polymer or binder film over the dust source and thereby persist even after evaporation of water in the suppressant. Such suppressant compositions typically contain a binder composition such as lignosulfonate and a polymeric dispersant. For example, U.S. Pat. No. 5,436,429 to Bennett describes such a long term dust suppressant and mentions in apssing that certain sugar by-products may be as a binder or tackifier. However, binders such as lignosulfonates and polymeric binders or dispersants are costly and create waste disposal problems.

Wet suppression is based on what is called "wet technology". This suppression can be as simple as spraying large amounts of water on the coal (or other source) as it travels along a conveyor or drops to a storage pile or transfer bin. However, although water is an effective dust suppressant, its use involves a number of drawbacks, such as adding weight to the coal or other source (which can result in higher costs for transporting the source), development of substantial vapor pressure when the coal or other source is heated or burned, and the absorption and thus wasting of substantial energy as the water vaporizes when the coal or other source is heated or burned.

As a result, surfactants or "wetters" often are added to the water to reduce the amount of the water needed for dust suppression. Conventional wetters include nonionic epoxide (e.g., ethylene oxide or propylene oxide) derived block co-polymers, alcohols of from about eight to about sixteen carbons ethoxylated with from about four to about ten moles of ethylene oxide (wherein the alcohol may be an aromatic such as alkyl phenol, preferably nonylphenol, which can be ethoxylated with, for example, ten moles ethylene oxide), and branched nonionic surfactants such as branched alpha sulfo ester salts comprising an acid chain and an alcohol chain of from about six to about twelve carbons each, and highly branched alcohol sulfate and alcohol ether sulfate detergents. Generally, the wetter is added to the water in a weight proportion of from about 0.2 to about 5 parts of the wetter to about one thousand parts of water. As this concentration, the wetter acts at the interface between the coal (or other source) and the water to increase the affinity of the coal and water, thereby decreasing the amount of water needed to soak the coal as well as decreasing the time required for the water to penetrate the coal stream.

Typically, such wet technology is employed to suppress dust Generated at transfer points, areas where the coal falls freely from one point to another (free falls) such as loading points where the coal is dropped into a vessel for transportation, impact points where the coal strikes a surface, and storage areas. The water is applied at the point of dust generation and is applied to the air-borne dust as well as to the source of the dust. If the amount of water added to the coal is sufficiently great, the coal can be prevented from dusting significantly on impact. For such benefits, the water should be added in an amount sufficient to result in a proportion of one to three parts by weight water per one hundred parts by weight wetted coal. However, because the suppressant is effective only through one or two impact points where dust could be generated, repeated applications are necessary, thereby increasing the water content of the wetted coal quickly to seven or eight percent.

Foam suppressants are applied to form a blanket over the coal or other source to capture and smother dust. Bubbles in the foam suppressant catch the dust particles and so the foam suppressant is effective only until the bubbles break or the layer of foam becomes discontinuous. The foam suppressant is formed by addition of a roamer to water. Conventional foamers include alpha-olefin sulfonates, alkylphenyl sulfonates with long alkyl chains (e.g., eight to sixteen carbons) such as sodium lauryl benzene sulfonate, alcohol sulfates, alcohol ether sulfates, alpha sulfo esters and mixtures of such compounds. Under standard conditions, from about one to about twenty parts by weight roamer is added to about one thousand parts by weight water. The resulting foam has about five to ten percent of the density of the water used in wet technology and so much less water is needed for a foam to provide the same volume of applied dust suppressant as the wet suppressant. Thus, the foam suppressant can be added to the coal in a proportion such that the wetted coal contains 0.2 to 0.5 parts by weight added water per one hundred parts by weight wetted coal. However, as with the wet suppressant, the foam suppressant is effective only through one or two impact points where dust could be generated. Thus, repeated applications are necessary and the water content of the wetted coal increases quickly to several percent.

As with wet suppressants, the foam suppressants are employed to suppress dust Generated at impact or transfer points, areas where the coal falls freely from one point to another (free falls) such as loading points where the coal is dropped into a vessel for transportation, impact points where the coal strikes a surface, and storage areas. The foam is applied as a curtain or barrier to capture Generated dust. The foam applicator nozzles are located in such a way that the remaining foam and the captured dust are deposited back onto the moving coal stream. This orientation not only prevents dust from escaping into the environment, but also places at least a partial blanket of foam onto the deposited coal, which may prevent dust Generation until bubbles are broken or disrupted by another transfer point. The dust suppression effects of normal foam does not carry over from a previous application point to further impact zone.

Long term residual dust control suppressants are used to prevent Generation of dust during long term storage or during transportation. Such long term residual suppressants operate by a mechanism very different from those of short term residual suppressants to which the subject invention is directed. In short term residual (wet or foam) suppression, the water eventually evaporates, rendering the suppressant ineffective in suppressing dust over a long term, such as during several months of outdoor storage. Thus, long term residual dust suppressants remain active long after the water evaporates. They ordinarily have some film-forming or tackifying properties. For example, U.S. Pat. No. 4,801,635 to Zinkan et al. describes a long term residual dust suppressant that includes an acrylic polymer and U.S. Pat. No. 4,169,170 to Doeken describes a long term residual dust suppressant that includes an aqueous suspension of asphalt emulsion concentrates or black liquor lignin products as a binder material. Conventionally, water is included in a long term residual suppressant typically not only to provide some dust control during handling prior to storage, but also to promote even spreading as the suppressant is applied. Long term residual dust suppressants often contain wetters or foamers as well to minimize the amount of water needed to apply the suppressant to the coal and are applied directly to the coal in what is known as a "main body treatment".

Thus, several problems are associated with conventional wet and foam dust suppression techniques to which the subject invention is directed. For example, each technique involves addition of a substantial amount of water to the coal or other dust source, especially in view of the repeated applications of water-based suppressant necessary to control dust across several impact or transfer points. The resulting high water content of the coal is particularly undesirable in that much dust suppression is performed at fossil fuel power plants. Water added to the fuel results in a portion of the heat output of the coal to be lost to vaporization of the water and so a loss of effective energy. The vaporization of water consumes substantial amounts of heat. Therefore, the addition of such significant amounts of water is particularly troublesome. In addition, the additional water increases the weight of the coal and so increases shipping costs accordingly.

Because of the substantial disadvantages associated with the addition of such significant amounts of water, the industry has attempted to minimize the amount of water employed in wet and foam suppression techniques. Such attempts typically involve the use of systems for application of the suppressant at each dust producing site instead of a single application that would be intended to last through many transfer points during transport or conveyance of the coal or other dust source. Because the suppressant in the multiple application technique remains effective for only one or two transfer points, such techniques are expensive; they require costly installation of application equipment at several transfer points, impact points and loading or "stack-out" storage sites. In addition, impact sites where dust is generated often are not accessible to the equipment employed in conventional application systems. Thus, such techniques are undesirable.

SUMMARY OF THE INVENTION

Briefly, therefore, the present invention is directed to a novel method for suppressing dust emanation from a dust-bearing material, comprising applying to the material a dust suppressant that is essentially free of lignosulfonate and comprises molasses-derived protein.

The present invention is also directed to a novel method for suppressing dust emanation from a dust-bearing material, comprising applying to the material a dust suppressant that is essentially free of polyarcrylates, polyvinyl alcohols and polyacrylamides and comprises molasses-derived protein.

The present invention is further directed to a novel method for suppressing dust emanation from a dust-bearing material, comprising applying to the material a dust suppressant consisting essentially of water, a composition selected from the group consisting of concentrated molasses solids and condensed molasses solids, and, optionally, a wetting agent, and also optionally, an agent for facilitating application of the dust suppressant to hydrophobic surfaces.

Among the several advantages found to be achieved by the present invention, therefore, may be noted the provision of an effective and long-term method for suppressing emanation of dust; the provision of suc method that avoids the need for lignosulfonates; and the provision of such method that obviates the need for polymers.

DESCRIPTION OF THE PREFERRED EMBODIMENTS

In accordance with the present invention, it has been discovered that an aqueous dust suppressant comprising molasses-derived protein yields surprisingly effective and long-lasting dust suppression without the need for lignosulfonates or polymers.

For convenience and shipping economies, the dust suppressant may be prepared by aqueous dilution of a concentrate comprising a derived-derived protein binder. In a preferred embodiment, the binder is concentrated molasses solids ("CMS"). CMS is a de-sugared molasses by-product of the sugar and molasses refining process and is a well known composition in the molasses processing industry. As suggested by its name, it is derived from molasses, which in itself is a product of sugar refining. While molasses has been reported to have been used in combination with coal dust for the formation of briquettes, use of CMS in connection with dust control in formulations of the present invention is unknown to the present inventors. There are a variety of sources of sugar, including sugarcane, sugar beets, citrus, starch and even wood, and molasses may be produced from any of them. And, although any of those sources may be used to produce CMS employed in the dust suppressants discussed herein, cane and beet are two sources of particular interest.

Molasses and its methods of production from such sources are, of course, well known. Likewise, methods for producing CMS from molasses are well known as well. One such method, wherein sugar is precipitated as a calcium salt, is known as the Steffens process.

Typically, as received, CMS contains less than about 20% sugar (which is typically predominantly sucrose). The other predominant components—other than water—of CMS are dissolved minerals in the form of ash, and protein, the latter of which is believed in particular to impart to the mixture the particularly efficacious binding properties desirable for a dust suppressant. An exemplary analysis of the composition of a typical CMS is as follows:

| Component | Approximate Concentration |
| --- | --- |
| Total Solids | 70.0%* |
| Sucrose | 26.5%** |
| Raffinose | 5.0%** |
| Nitrogen Compounds (as N) | 3.5%** |
| Crude Protein | 22.0%** |
| Betaine | 8.5%** |
| Amino Acids | 0.5%** |
| Ash | 30.0%** |
| Other Components | 4.0%** |

*Based on total composition
**Based on total dissolved solids

Alternatively or additionally, the binder may comprise condensed molasses solids, which is sometimes also referred to as "CMS," but is distinct from the concentrated molasses solids discussed above and referred to herein as CMS. Therefore, to avoid confusion, condensed molasses solids will not be referred to herein as "CMS." In any event, condensed molasses solids, which is a residue remaining after molasses has been fermented and the alcohol has been distilled off, is also a well-known composition. It is referred to in U.S. Pat. No. 5,536,429, and is available for purchase under the trade designation Brewex.

The dust suppressant concentrate may comprise solely the binder, but in another embodiment, the binder makes up about 15% by weight to about 95% by weight, such as about 50% by weight to about 70% by weight, of the concentrate. The concentrate may also comprise a wetting agent. The wetting agent may be a single surfactant or it may comprise a plurality of surfactants. Although the wetting agent may make up more than 15% by weight of the concentrate, the economics can suggest a wetting agent concentration in the concentrate of less than about 15% by weight, such as about 2% by weight to about 10% by weight, for example, about 5% by weight to about 7% by weight.

Anionic and nonionic surfactants have been found to be effective, and cationic surfactants are understood to be suitable as well. In particular, it has been found that use of surfactants the impart to the suppressant a low drop time, such as below about 200 seconds, preferably below about 90 seconds, has yielded especially efficacious dust suppressants. When reference is made herein to "drop time" what is meant is the drop time of coal dust particles of interest in an aqueous solution containing 1% by weight of the surfactant (s) in question and the concentration of binder to be used, as measured by the Walker et al. procedure for measuring coal dust wetting described in Glanville et al., "Coal Dust Phenomena and Control Technology," University of West Virginia (1952), at p. 395, and illustrated in Example 4, below. The test is based on the rate at which small coal particles piled on a liquid surface below the critical wetting tension descend into the liquid phase. By such testing, for example, DOSS (a 70% aqueous solution of dioctyl sodium sulfosuccinate, CAS# 577-11-7, in diethylene glycol), Neodol 91-6 (also known as Tomadol 91-6, a six-mole ethoxylate of linear $C_9$ to $C_{11}$ alcohols, CAS# 68439-46-3), Polysorbate-80 (a Sorbitan monooleate, CAS# 9005-65-6), and NP-9 (nonylphenol 9 mole ethoxylate, CAS# 9016-45-9) have been found to be well-suited to the subject application.

The bulk of the concentrate (that is, for example, up to about 85%) may be water, but it has been found that for more hydrophobic surfaces, such as more carbonaceous dust-producing materials, such as petroleum coke, it may be advantageous to include a low HLB surfactant (for example, one having an HLB below 5, such as about 1 or 2), for instance, a diethylene glycol dibutyl ether, in the concentrate. An example of such surfactant is Dowanol DB (diethylene glycol, n-butyl ether, CAS# 112-34-5). The low HLB surfactant may be employed at a concentration on the order of about 1% by weight to about 5% by weight, such as about 2–3% by weight, based on the total weight of the concentrate.

Although the concentrate ingredients may be mixed together by standard techniques in any order, preferably the water is added to the wetting agent, and then the CMS is added to that resulting mixture. At any desired time, such as after shipment of the concentrate to the situs of application, for example, during the application itself, the concentrate may be diluted with water. In one embodiment, the concentrate is diluted in a proportion of 99 parts by weight water to one part by weight concentrate, such as by means of a proportionate chemical pump, during spray-on application to the dust-generating surface. In such embodiment, the binder and wetting agent concentrations in the dust suppressant therefore are about 1% those of the concentrate. Thus, for example, the concentration of the binder in the dust suppressant in such embodiment may be from about 0.15% by weight to about 1% by weight, such as from about 0.5% by weight to about 0.7% by weight, and the concentration of the wetting agent (which, again, may be a single surfactant or a combination of surfactants), if present, typically is as high as about 0.15% by weight, such as about 0.02% by weight to about 0.1% by weight, for example, from about 0.05% by weight to about 0.07% by weight, based on the total weight of the dust suppressant. Similarly, typical concentrations of sugar (mostly sucrose) in the dust suppressant are less than about 0.25% by weight, or even less than about 0.1% by weight, such as about 0.05% by weight to about 0.2% by weight, typical concentrations of protein in the dust suppressant are from about 0.05% by weight to about 0.2% by weight, and typical concentrations of ash in the dust suppressant are from about 0.1% to about 0.25% by weight, all based on the total weight of the dust suppressant. If present, the low HLB surfactant(s) may have a concentration of about 0.01% by weight to about 0.05% by weight, such as about 0.2–0.25% by weight, based on the total weight of the dust suppressant.

The dust suppressant may be applied to the dust-generating material by standard techniques, such as by way of a spray manifold designed to produce a uniformly thick foam coat over the dust-generating material. The dust suppressant may be applied in concentrations typically employed with conventional suppressant compositions. By way of illustration, 20 to 100 pounds, such as about 30 to about 60 pounds, for instance, 40 pounds, of the dust suppressant may be applied per ton of dust-generating material. The dust suppressant cures by drying onto the surface of the material. CMS has been found to bind the dust particles to larger particles, preventing the dust particles from becoming airborne. The effect has been discovered to be still apparent even after three weeks at 30% relative humidity at 90° F.

As noted, the dust suppressant of this invention has been found to provide long term dust suppression without the need for lignosulfonates, polyarcrylates, polyvinyl alcohols, polyacrylamides or any other polymers or other additives conventionally employed for long term dust suppression. Indeed, in many situations, the present formulation has been found to provide even longer term and more effective dust suppression than achieved with such conventional formulations.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

EXAMPLE 1

A standard lignosulfonate dust suppressant composition (identified herein as "A-Lig") comprising 33% by weight lignosulfonate solution, 26% by weight urea solution, 2% by weight DOSS, and 2% by weight Tomadol 91-6 was tested, as was a comparative sample (identified herein as "A-CMS") of identical composition as A-Lig except that the lignosulfonate solution was replaced with the same mass of beet molasses-derived CMS obtained from Monitor Sugar Company of Michigan and a second comparative sample (identified herein as "B-CMS") composed of 60% by weight beet molasses-derived CMS, 2% by weight DOSS, and 1.5% by weight polysorbate-80. By way of illustration, A-CMS was prepared by stirring 50% urea (10.4 pounds) from Mississippi Chemical Corporation into the CMS (13.2 pounds) to produce a homogeneous solution and then adding 70% DOSS (a little over 0.75 pounds) obtained from American Emulsions Co., Inc. and Tomadol 91-6 (a little over 0.75 pounds) from Tomah Products, Inc. with stirring with water (about 15 pounds) to the homogeneous solution, and the resulting mixture was stirred for about 15 minutes, thereby producing an opaque homogeneous solution. Each formulation was applied at a 100:1 aqueous dilution with commercial dust suppression equipment to sub-bituminous coal at a rate of 0.03 gallons of the formulated undiluted product per ton of coal and a total 2% moisture addition (that is, the amount of each test composition added to the coal was such that the weight of the water in that amount of added composition was 2% of the weight of the coal treated). In each case, the treated coal was aged at about 30% relative humidity for 28 days at 90° F. (about 32° C.). Samples of the treated coal were removed every seven days and tested according to ASTM D 547-41. The results were as follows, wherein the dust levels are given in mg/m$^3$:

|  | Dust Level | | | | |
| --- | --- | --- | --- | --- | --- |
| Dust Suppressant | Initial | 7 days | 14 days | 21 days | 28 days |
| None (control) | 0.67 | 8.24 | 13.00 | 29.85 | 23.45 |
| A-Lig | 0.11 | 1.85 | 11.20 | 11.70 | 12.80 |
| A-CMS | 0.18 | 4.14 | 11.94 | 9.31 | 10.65 |
| B-CMS | 0.135 | 2.58 | 8.30 | 8.76 | 10.00 |

The difference in performance between A-Lig and B-CMS initially and at seven days is not statistically significant; however, the differences at fourteen days and longer are statistically significant.

EXAMPLE 2

A sufficient quantity of the dust suppressant discussed in Example 1 (B-CMS), a dust suppressant (identified herein as "C-Lig") comprising 85.04% by weight lignosulfonate solution, 2.3% Dowanol DB and 1.71% NP 9, and a dust suppressant (identified herein as "C-CMS") comprising 85.04% by weight of the above noted CMS, 2.3% Dowanol DB and 1.71% NP 9, were prepared. The bulk of each formulation was water. By way of illustration, formulation B-CMS was prepared by stirring a mixture of 70% DOSS (a little over 0.75 pounds) from American Emulsions Co., Inc. and Polysorbate-80 (a little over 0.5 pounds) from BASF until the mixture became uniform and then stirring in CMS (24 pounds) from Monitor Sugar Company, and then adding water (almost 15 pounds) to the mixture and stirring the resulting mixture for about half an hour until an opaque homogeneous solution was formed. Each solution was applied to shot coke and tested as described in Example 1, above, with the test running for 21 days. The results were as follows, wherein the dust levels are given in mg/m$^3$:

|  | Dust Level | | | |
| --- | --- | --- | --- | --- |
| Dust Suppressant | Initial | 7 Days | 14 Days | 21 Days |
| None (control) | 3.60 | 4.03 | 7.55 | 7.58 |
| C-Lig | 0.21 | 2.79 | 4.26 | 5.44 |
| C-CMS | 0.25 | 1.96 | 5.57 | 4.67 |
| B-CMS | 0.21 | 2.56 | 3.90 | 4.63 |

EXAMPLE 3

Additional tests were conducted according to the procedures of Examples 1 and 2, above, with the formulations identified therein, as well as a formulation identified as B-Lig of identical composition as B-CMS, except that the CMS was replaced with the same mass of lignosulfonate solution and an additional formulation of a lignosulfonate dust suppressant composition (identified herein as "D-Lig") comprising 33% by weight lignosulfonate solution, 26% by weight urea solution, and 2% by weight DOSS was tested, as was a comparative sample (identified herein as "D-CMS") of identical composition as D-Lig except that the lignosulfonate solution was replaced with the same mass of beet molasses-derived CMS obtained from Monitor Sugar Company of Michigan using sub-bituminous coal. The results were as follows, wherein the dust levels are given in mg/m$^3$:

|  | Dust Level | | | |
| --- | --- | --- | --- | --- |
| Dust Suppressant | Initial | 7 days | 14 days | 28 days |
| None (control) | 14.8 | 12.7 | 21.0 | 19.0 |
| A-Lig | 0.7 | 5.3 | 15.9 | 18.5 |
| A-CMS | 0.5 | 6.1 | 11.3 | 19.3 |
| B-Lig | 1.7 | 9.6 | 14.1 | 20.5 |
| B-CMS | 0.8 | 8.0 | 9.9 | 18.6 |
| C-Lig | 2.9 | 15.6 | 16.8 | 18.7 |
| C-CMS | 1.8 | 15.8 | 14.5 | 21.1 |

-continued

| Dust Suppressant | Dust Level | | | |
|---|---|---|---|---|
| | Initial | 7 days | 14 days | 28 days |
| D-Lig | 1.7 | 10.9 | 20.4 | 19.9 |
| D-CMS | 0.7 | 7.2 | 14.8 | 19.1 |

EXAMPLE 4

Drop tests were carried out on dust suppressant samples identified above as A-Lig, A-CMS, B-CMS, D-Lig, D-CMS, and a formulation of 60% by weight CMS, 3% by weight DOSS, 3% by weight Tomadol 91-6, and 34% by weight water, identified herein as "E." An amount (5 gm) of each sample was diluted with water (495 ml) to produce a test sample. For each test, a sample of dry coal dust (1.1 gm), 200 mesh or finer, was placed gently on the surface of the test sample in a 4-inch diameter 1-L beaker, wherein the sample is at least 2.5 inches below the level of the top of the beaker. The time from the point at which the coal came into contact with the surface of the test sample until all of the coal particles left the surface was measured and recorded. The following results were obtained:

| Sample | Drop Time (sec.) |
|---|---|
| A-Lig | 56 |
| A-CMS | 47 |
| B-CMS | 189 |
| D-Lig | 76 |
| D-CMS | 101 |
| E | 34 |

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A method for suppressing dust emanation from a dust-bearing material, comprising applying to the material a dust suppressant which comprises a molasses solids composition comprising molasses-derived protein, wherein the molasses solids composition contains less than 20% sugar, and wherein said dust suppressant is essentially free of lignosulfonate.

2. A method as set forth in claim 1 wherein the dust suppressant comprises water and the molasses solids composition, wherein the molasses solids composition is selected from the group consisting of concentrated molasses solids and condensed molasses solids.

3. A method as set forth in claim 2 wherein the molasses solids composition is concentrated molasses solids.

4. A method as set forth in claim 3 wherein the dust suppressant further comprises a wetting agent.

5. A method as set forth in claim 4 wherein the wetting agent is a combination of a plurality of surfactants.

6. A method as set forth in claim 4 wherein the wetting agent imparts to the dust suppressant a drop time of less than about ninety seconds.

7. A method as set forth in claim 4 wherein the dust suppressant further comprises a diethylene glycol butyl ether.

8. A method as set forth in claim 2 wherein the dust suppressant comprises from about 0.1 percent by weight to about 1 percent by weight concentrated molasses solids and from about 99 percent by weight to about 99.9 percent by weight water.

9. A method as set forth in claim 8 wherein the dust suppressant further comprises from about 0.02 percent by weight to about 0.1 percent by weight wetting agent.

10. A method as set forth in claim 9 wherein the wetting agent is a combination of a plurality of surfactants.

11. A method as set forth in claim 1 wherein the material is selected from the group consisting of coal, petroleum coke, iron ore, aluminum ore, copper ore, and limestone.

12. A method as set forth in claim 3 wherein the material is selected from the group consisting of coal, petroleum coke, iron ore, aluminum ore, copper ore, and limestone.

13. A method as set forth in claim 8 wherein the material is selected from the group consisting of coal, petroleum coke, iron ore, aluminum ore, copper ore, and limestone.

14. A method as set forth in claim 1 wherein the material is coal.

15. A method as set forth in claim 3 wherein the material is coal.

16. A method as set forth in claim 8 wherein the material is coal.

17. A method as set forth in claim 7 wherein the material is petroleum coke.

18. A method as set forth in claim 1 wherein the dust suppressant is applied to the material by spraying the dust suppressant onto the material.

19. A method as set forth in claim 1 wherein the dust suppressant is prepared by diluting with water a concentrate comprising at least about 15% by weight concentrated molasses solids.

20. A method as set forth in claim 1 wherein the dust suppressant is essentially free of polyarcrylates, polyvinyl alcohols and polyacrylamides.

21. A method for suppressing dust emanation from a dust-bearing material, comprising applying to the material a dust suppressant which comprises a molasses solids composition comprising molasses-derived protein, wherein the molasses solids composition contains less than 20% sugar, and wherein said dust suppressant is essentially free of polyarcrylates, polyvinyl alcohols and polyacrylamides.

22. A method as set forth in claim 21 wherein the dust suppressant comprises water and the molasses solids composition, wherein the molasses solids composition is selected from the group consisting of concentrated molasses solids and condensed molasses solids.

23. A method as set forth in claim 22 wherein the molasses solids composition is concentrated molasses solids.

24. A method as set forth in claim 23 wherein the dust suppressant further comprises a wetting agent.

25. A method as set forth in claim 24 wherein the wetting agent is a combination of a plurality of surfactants.

26. A method as set forth in claim 24 wherein the wetting agent imparts to the dust suppressant a drop time of less than about ninety seconds.

27. A method as set forth in claim 24 wherein the dust suppressant further comprises a diethylene glycol butyl ether.

28. A method as set forth in claim 23 wherein the dust suppressant comprises from about 0.1 percent by weight to about 1 percent by weight concentrated molasses solids and from about 99 percent by weight to about 99.9 percent by weight water.

29. A method as set forth in claim 28 wherein the dust suppressant further comprises from about 0.02 percent by weight to about 0.1 percent by weight wetting agent.

30. A method as set forth in claim 29 wherein the wetting agent is a combination of a plurality of surfactants.

31. A method for suppressing dust emanation from a dust-bearing material, comprising applying to the material a dust suppressant consisting essentially of water, a molasses solids composition selected from the group consisting of concentrated molasses solids and condensed molasses solids, wherein the molasses solids composition contains less than 20% sugar, and, optionally, a wetting agent, and optionally, an agent for facilitating application of the dust suppressant to hydrophobic surfaces.

32. A method as set forth in claim 31 wherein the molasses solids composition is concentrated molasses solids.

33. A method as set forth in claim 31 wherein the wetting agent is a combination of a plurality of surfactants.

34. A method as set forth in claim 31 wherein the wetting agent imparts to the dust suppressant a drop time of less than about ninety seconds.

35. A method as set forth in claim 31 wherein the agent for facilitating application of the dust suppressant to hydrophobic surfaces is diethylene glycol butyl ether.

36. A method as set forth in claim 31 wherein the dust suppressant comprises from about 0.1 percent by weight to about 1 percent by weight concentrated molasses solids and from about 99 percent by weight to about 99.9 percent by weight water.

37. A method as set forth in claim 36 wherein the dust suppressant further comprises from about 0.02 percent by weight to about 0.1 percent by weight wetting agent.

38. A method for suppressing dust emanation from a dust-bearing material, comprising applying to the material a dust suppressant comprising water and concentrated molasses solids, wherein the concentrated molasses solids contains less than 20% sugar.

39. A method as set forth in claim 38 wherein the dust suppressant further comprises a wetting agent.

40. A method as set forth in claim 39 wherein the wetting agent is a combination of a plurality of surfactants.

41. A method as set forth in claim 39 wherein the wetting agent has a drop time of less than about ninety seconds.

42. A method as set forth in claim 39 wherein the dust suppressant further comprises a diethylene glycol butyl ether.

* * * * *